(12) United States Patent
Dai

(10) Patent No.: US 7,647,312 B2
(45) Date of Patent: Jan. 12, 2010

(54) SYSTEM AND METHOD FOR AUTOMATIC GENERATION OF SUGGESTED INLINE SEARCH TERMS

(75) Inventor: James Dai, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 11/127,131

(22) Filed: May 12, 2005

(65) Prior Publication Data
US 2006/0259479 A1  Nov. 16, 2006

(51) Int. Cl.
G06F 17/30 (2006.01)
G06F 7/00 (2006.01)
(52) U.S. Cl. .............................................. 707/4; 707/5
(58) Field of Classification Search ...................... 707/4, 707/5
See application file for complete search history.

(56) References Cited

U.S. PATENT DOCUMENTS

| | | | |
|---|---|---|---|
| 5,768,581 A * | 6/1998 | Cochran | 707/5 |
| 5,995,979 A * | 11/1999 | Cochran | 707/104.1 |
| 6,006,225 A * | 12/1999 | Bowman et al. | 707/5 |
| 6,026,398 A * | 2/2000 | Brown et al. | 707/5 |
| 6,169,986 B1 * | 1/2001 | Bowman et al. | 707/5 |
| 6,377,965 B1 * | 4/2002 | Hachamovitch et al. | 715/203 |
| 6,411,950 B1 * | 6/2002 | Moricz et al. | 707/3 |
| 6,460,029 B1 * | 10/2002 | Fries et al. | 707/3 |
| 6,513,031 B1 * | 1/2003 | Fries et al. | 707/3 |
| 6,564,213 B1 * | 5/2003 | Ortega et al. | 707/5 |
| 6,601,059 B1 * | 7/2003 | Fries | 707/3 |
| 6,647,383 B1 * | 11/2003 | August et al. | 707/3 |

(Continued)

OTHER PUBLICATIONS

Chang, Eric, et al., "Efficient Web Search on Mobile Devices with Multi-Modal Input and Intelligent Text Summarization", Proc. of the 11th International World Wide Web Conference, © 2002, pp. 1-4.*

(Continued)

Primary Examiner—Robert Stevens
(74) Attorney, Agent, or Firm—Shook, Hardy & Bacon LLP

(57) ABSTRACT

A system and related techniques detect the initiation of a user's search input and monitor that input character-by-character, to generate suggested search terms on the fly. Arbitration logic may monitor the user's keyboard of other entry of search or query terms at a Web search site or other search engine or resource, and examine that input along with stored query history or usage data on a real-time basis to predict or infer search terms which the user is attempting to transmit. Spelling corrections may likewise be made. According to embodiments, the arbitration logic and/or query history or usage data may be hosted in the user's machine, in the search service itself or in other resources. As the arbitration logic generates suggested search terms in inline fashion, those search suggestions may be presented to the user in real-time, for example by way of a wordwheel, drop-down or other dialog or interface. The user may for example choose to select one of the set of search suggestions before completing the typing or other inputting of their search data, and in embodiments may edit those suggestions in real-time as well. According to embodiments in a further regard, the user may provide configuration inputs to the automatic inline search suggestion feature, for example to turn that capability on or off on a per-session, per-search, permanent or other basis.

16 Claims, 5 Drawing Sheets

U.S. PATENT DOCUMENTS

| | | | |
|---|---|---|---|
| 6,704,727 B1 * | 3/2004 | Kravets | 707/5 |
| 6,732,088 B1 * | 5/2004 | Glance | 707/3 |
| 6,751,606 B1 * | 6/2004 | Fries et al. | 707/3 |
| 7,240,049 B2 * | 7/2007 | Kapur | 707/3 |
| 7,424,486 B2 * | 9/2008 | Whitman et al. | 707/102 |
| 7,487,145 B1 * | 2/2009 | Gibbs et al. | 707/4 |
| 7,499,940 B1 * | 3/2009 | Gibbs | 707/102 |
| 2002/0059204 A1 * | 5/2002 | Harris | 707/3 |
| 2002/0147724 A1 * | 10/2002 | Fries et al. | 707/100 |
| 2003/0009447 A1 * | 1/2003 | Murray et al. | 707/3 |
| 2003/0041147 A1 * | 2/2003 | van den Oord et al. | 709/227 |
| 2003/0120733 A1 * | 6/2003 | Forman | 709/206 |
| 2004/0230574 A1 * | 11/2004 | Kravets | 707/5 |
| 2004/0236736 A1 * | 11/2004 | Whitman et al. | 707/3 |
| 2004/0254928 A1 * | 12/2004 | Vronay et al. | 707/5 |
| 2005/0102259 A1 * | 5/2005 | Kapur | 707/1 |
| 2005/0283468 A1 * | 12/2005 | Kamvar et al. | 707/3 |
| 2006/0106769 A1 * | 5/2006 | Gibbs | 707/3 |
| 2006/0156233 A1 * | 7/2006 | Nurmi | 715/532 |
| 2006/0253427 A1 * | 11/2006 | Wu et al. | 707/3 |

OTHER PUBLICATIONS

Buyukkokten, Orkut, et al., "Accordion Summarization for end-game browsing on PDAs and Cellular Phones", CHI 2001, Seattle, WA, Mar. 31-Apr. 5, 2001, pp. 213-220.*

Jones, Steve, et al., "Using Keyphrases as Search Result Surrogates on Small Screen Devices", Personal and Ubiquitous Computing, vol. 8, Issue 1, Feb. 2004, pp. 55-68.*

Aridor, Yariv, et al., "Knowledge Encapsulation for Focused Search from Pervasive Devices", ACM Transactions on Information Systems, vol. 20, No. 1, Jan. 2002, pp. 25-46.*

Wang, Fei-Yue, et al., "An Application Specific Knowledge Engine for Researches in Intelligent Transportation Systems", 2004 IEEE Intelligent Transportation Systems Conference, Washington, DC, Oct. 3-6, 2004, pp. 841-846.*

Blocks, D., et al., "Qualitative Evaluation of Thesaurus-Based Retrieval", ECDL 2002, LNCS 2458, Springer-Verlag, Berlin, Germany, © 2002, pp. 346-361.*

Baeza-Yates, Ricardo, et al., "Query Recommendation Using Query Logs in Search Engines", EDBT 2004 Workshops, LNCS 3268, Springer-Verlag, Berlin, Germany, © 2004, pp. 588-596.*

Pitkow, James, et al., "Personalized Search", Communications of the ACM, vol. 45, No. 9, Sep. 2002, pp. 50-55.*

* cited by examiner

SYSTEM AND METHOD FOR AUTOMATIC GENERATION OF SUGGESTED INLINE SEARCH TERMS

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of computerized information retrieval, and more particularly to a system and method for monitoring a user's input of search characters to automatically generate suggested inline search input, before completion of the search input is made.

BACKGROUND OF THE INVENTION

Web-based and other search services have proliferated in recent years. Those search pages and other resources have gradually increased in power and sophistication. One area in which search services have become more sophisticated is user search help. For example, some search services today may spell check the words or other search input received from a user after the user has hit the "enter" button or otherwise initiated active search processing on the remote server or other resource. In this manner, the search service may provide enhancements such as correcting obvious typographical errors before the user notices those errors in the returned search results, enhancing the search experience.

However, these and other search enhancements in general rely upon receipt of the search input in its entirety on the server side, before attempting to spell check or otherwise enhance the set of search inputs on the user's behalf. Therefore at least one round-trip of the search terms must take place, before any automatic help is generated. Moreover the search service itself therefore expends processing time on a set of search terms which may contain erroneous terms or other input. Other problems in search and search interface technology exist.

SUMMARY OF THE INVENTION

The invention overcoming these and other problems in the art relates in one regard to a system and method for automatic generation of suggested inline search terms, in which arbitration logic monitors the entry of inputted search terms to a search service or engine on a character-by-character basis. As the entry of the search input progress, the arbitration logic may detect potential suggested search terms, based on the search input received to that point, the user's query history, aggregate usage or result patterns determined by the search service, or based on other behavior or parameters. The set of search suggestions may be passed back to the user's Web browser or other application, for example to be presented in drop-down, wordwheel or other selectable format. The user may thus accept or select inline search suggestions on the fly, without having to wait to transmit the entire search input or query to the search service and wait for search results to be returned before receiving such suggestions.

DETAILED DESCRIPTION OF EMBODIMENTS

Figure 1:
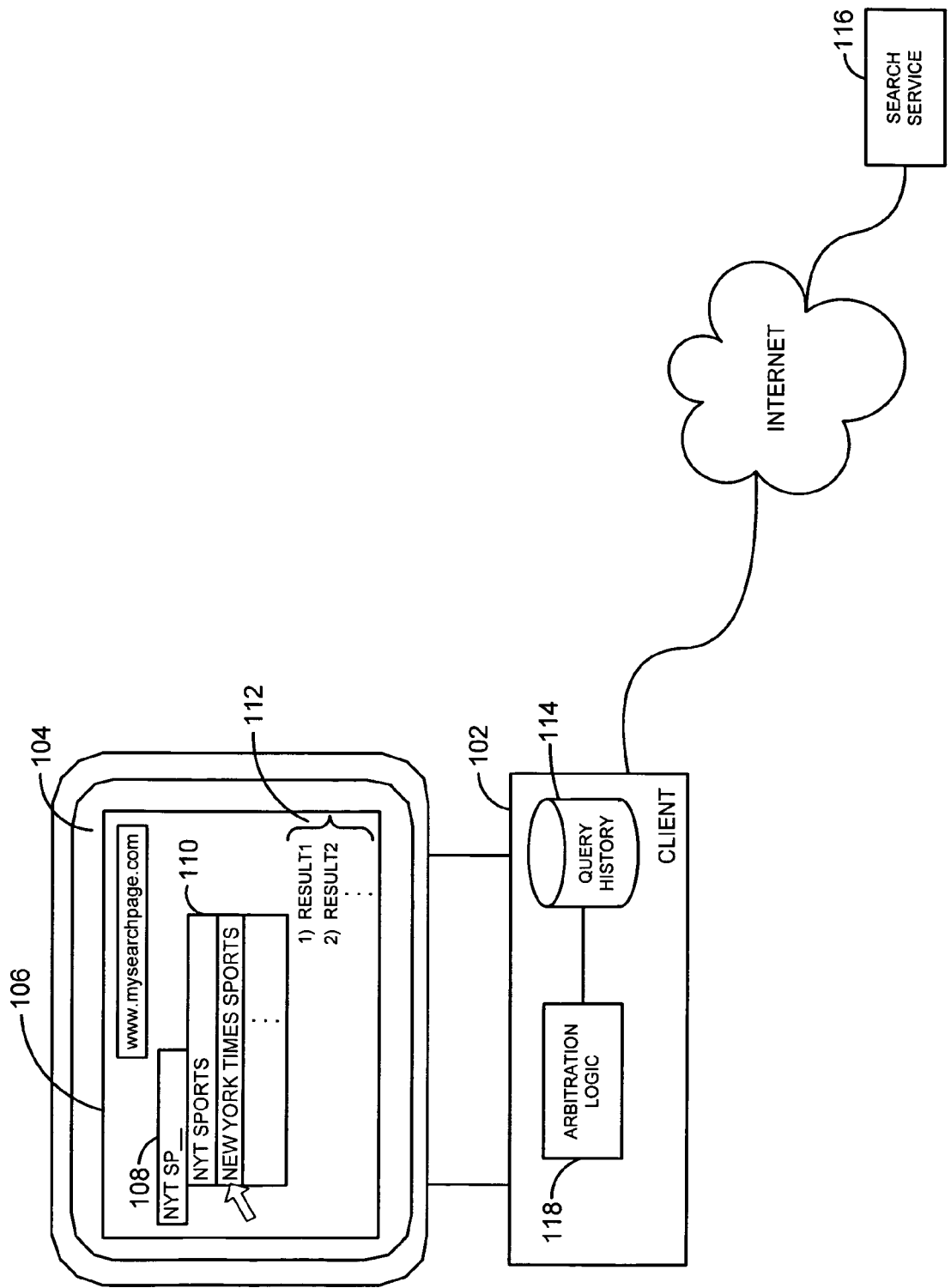
FIG. 1 illustrates an overall environment in which a system and method for automatic generation of suggested inline search terms may operate, according to embodiments of the invention.

FIG. 1 illustrates an environment in which a system and method for automatic generation of suggested inline search terms may operate, according to embodiments of the invention. As illustrated in that figure a user may operate a client 102 such as a desktop or laptop computer, a network-enabled cellular telephone, wireless email client, or other client, machine or device to perform various tasks including Web browsing, search, electronic mail (email) and other tasks, applications and functions. The user may interact with those resources via a user interface 104, such as a graphical user interface, command-line user interface, voice-recognition interface or other interface, for example to navigate to search page 106, such as an Internet or other public or private networked search page. In general the user may supply search input 108 such as typed words or other alphanumeric or other data to conduct a search via a search service 116 to receive a set of search results 112 reflecting content which contains or reflects information related to the search input 108.

According to embodiments of the invention in a further regard, client 102 may host arbitration logic 118 along with a query history 114 to monitor and analyze the search input 108 to generate and introduce a set of search suggestions 110, in real time fashion inline with the entry of the search input 108. That is, according to embodiments of the invention in one regard, arbitration logic 118 may parse the search input 108 on a character-by-character or other realtime or on-the-fly basis as the user types or otherwise inputs that data, and analyze that input on the fly via query history 114 and other resources to generate a set of search suggestions 110 which may be inferred to be related to the user's search intent. According to embodiments of the invention, the set of search suggestions 110 may be presented to the user via a drop-down, wordwheel, popup or other interface or format, which may for example be selectable by mouse click or other selection. Thus for example and as shown, as the user inputs text such as "NYT SP" in search input 108, arbitration logic 118 may examine query history 114 or other sources, such as stores or data in search service 116, to generate "New York Times Sports" as a potential or likely candidate for the user's intended search terms, based on past search terms, search results, user navigation or other factors. In embodiments as shown, the user need not complete the typing of that set of terms if desired, but may simply select, hit return on or otherwise activate that suggestion to transmit that search input 108 to search service 116, without waiting for initial search results to be processed and passed back from search service 116.

Figure 5:
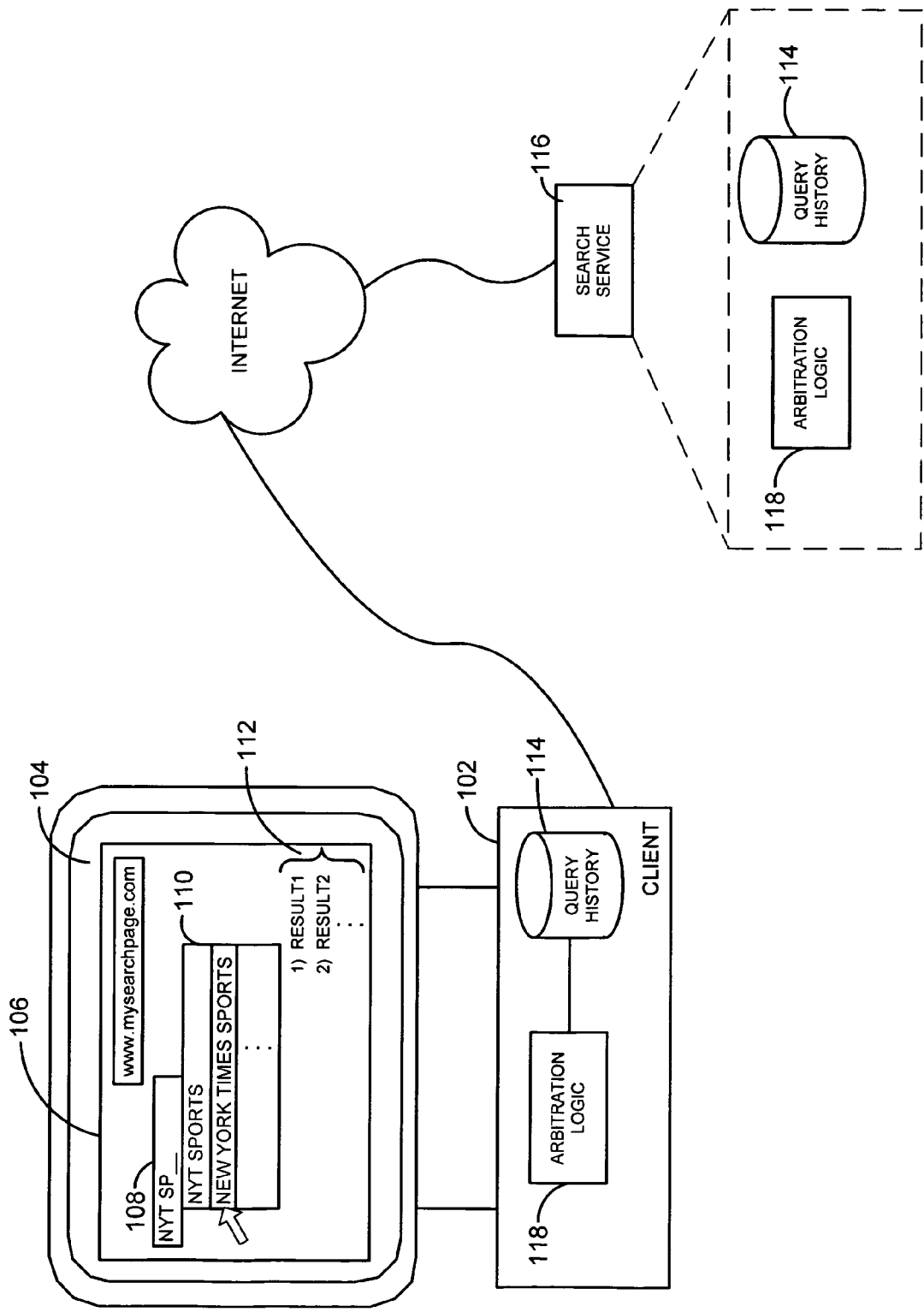
FIG. 5 illustrates an overall environment in which a system and method to generate, inline, a set of search suggestion, including search terms, according to an alternative embodiment of the invention.

FIG. 5 illustrates an overall environment in which a system and method to generate, inline, the set of search suggestion 110, including search terms, according to an alternative embodiment of the invention. Here, the query history 114 and the arbitration logic 118 may be components of the search service 116. When the client 102 is a lightweight device, such as, for example, a pager or cell phone, inline processing of the search input 108 may require performing operations that need large amounts of computational resources. The lightweight device has small amounts of computational resources so it may be efficient to transmit the operations that need large amounts of computational resources to the search service 116. Therefore, operations requiring small amounts of computational resources may be processed on the lightweight device, while the operations that need large amounts of computational resources may be processed on the search service 116. Additionally, in an embodiment of the invention the search service 116 may process all operations that enable the generation of the set of search suggestions 110, and the client 102 enters the search input 108 and receives the set of search suggestions 110 on the fly. Accordingly, the search service 116 and the client 102 communicate between each keystroke to allow the search service 116 to generate and transmit the set of search suggestions 110 on the fly.

Figure 2:
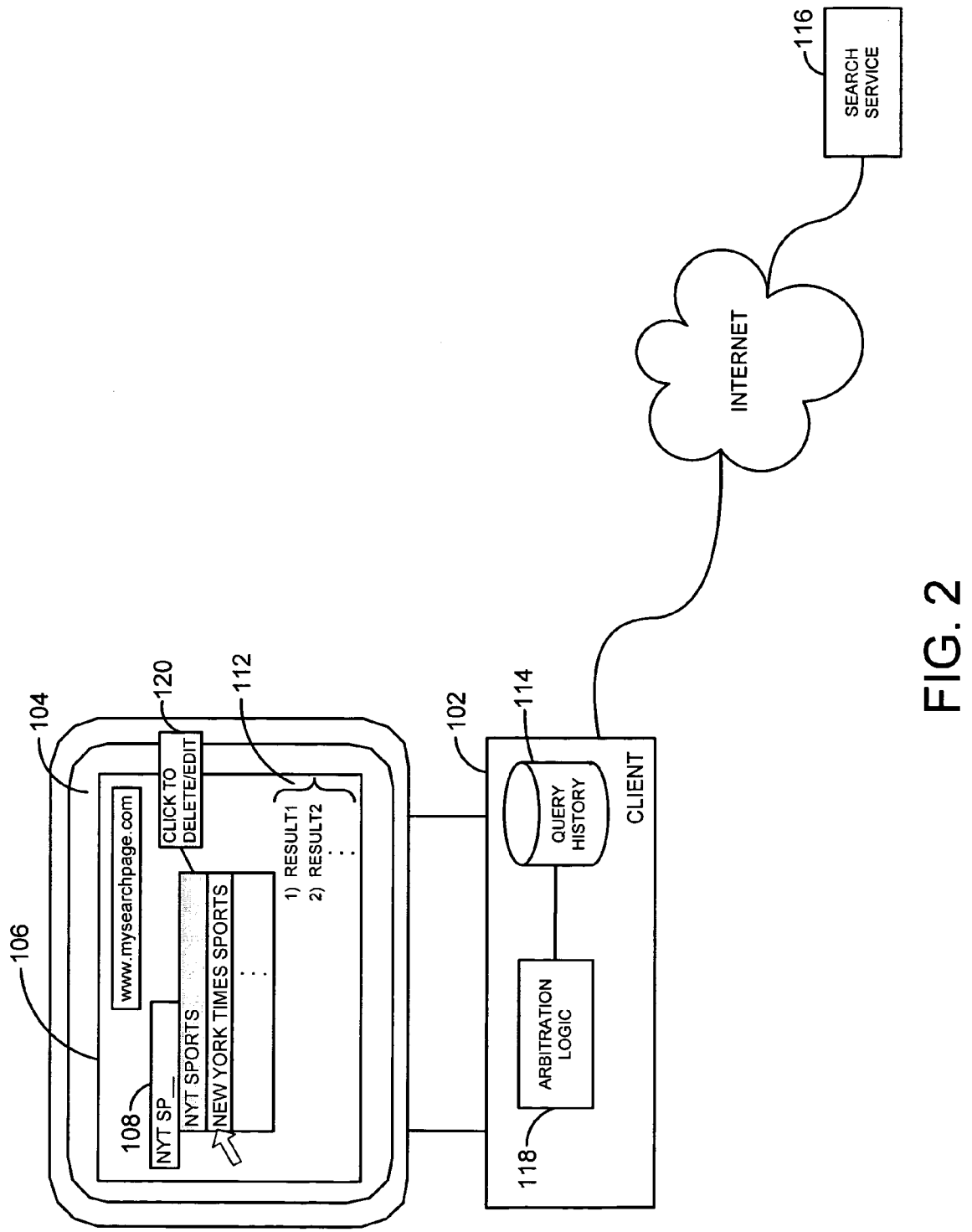
FIG. 2 illustrates an overall environment in which a system and method for automatic generation of suggested inline search terms may operate, according to embodiments of the invention in another regard.

According to embodiments of the invention as for example illustrated in FIG. 2, the set of search suggestions 110 may likewise include or have associated with them a set of selectable edit options 120, which may for example present options to the user to edit, delete or otherwise modify or manipulate one or more suggestions in the set of search suggestions 110. According to embodiments as shown, the selectable edit options 120 may include the option to delete an individual suggested search term which the user finds to not useful or relevant. Other editing options, such as for instance adding terms or correcting the spelling of suggested terms, are possible. The modifications to the set of search suggestions 110 may be transmitted to arbitration logic 118 or other resources, to incorporate those modifications in future search suggestions.

Figure 3:
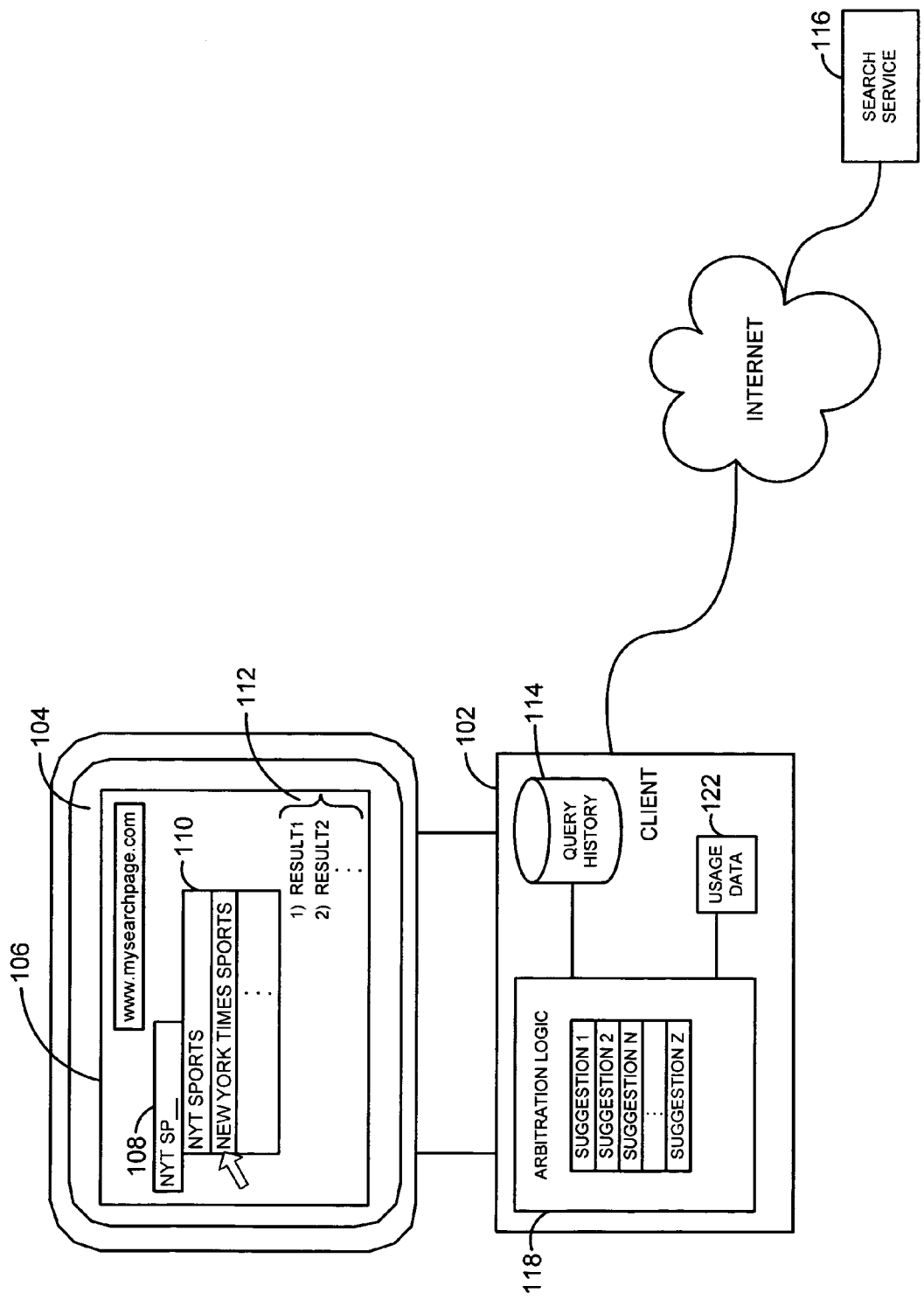
FIG. 3 illustrates an overall environment in which a system and method for automatic generation of suggested inline search terms may operate, according to embodiments of the invention in a further regard.

According to embodiments of the invention in a further regard, and as for example illustrated in FIG. 3, the arbitration logic 118 which generates and manages the set of search suggestions 110 may order and re-order potential suggested search terms, based on ongoing evaluations of the relevance of those suggested terms to the user's search input 108. According to embodiments, that relevance ranking may in embodiments for example also access usage data 122 as well as the user's query history 114. The usage data 122 may in embodiments reflect aggregate user search behavior, for example captured by search service 116 or otherwise, to predict the relevance or one or more terms or sets of terms to partial or complete inputs received by arbitration logic 118. The set of search suggestions 110 generated and presented for a given partial or complete query string may therefore evolve over time as relevance ratings are refined based on individual or collective search behavior.

Figure 4:
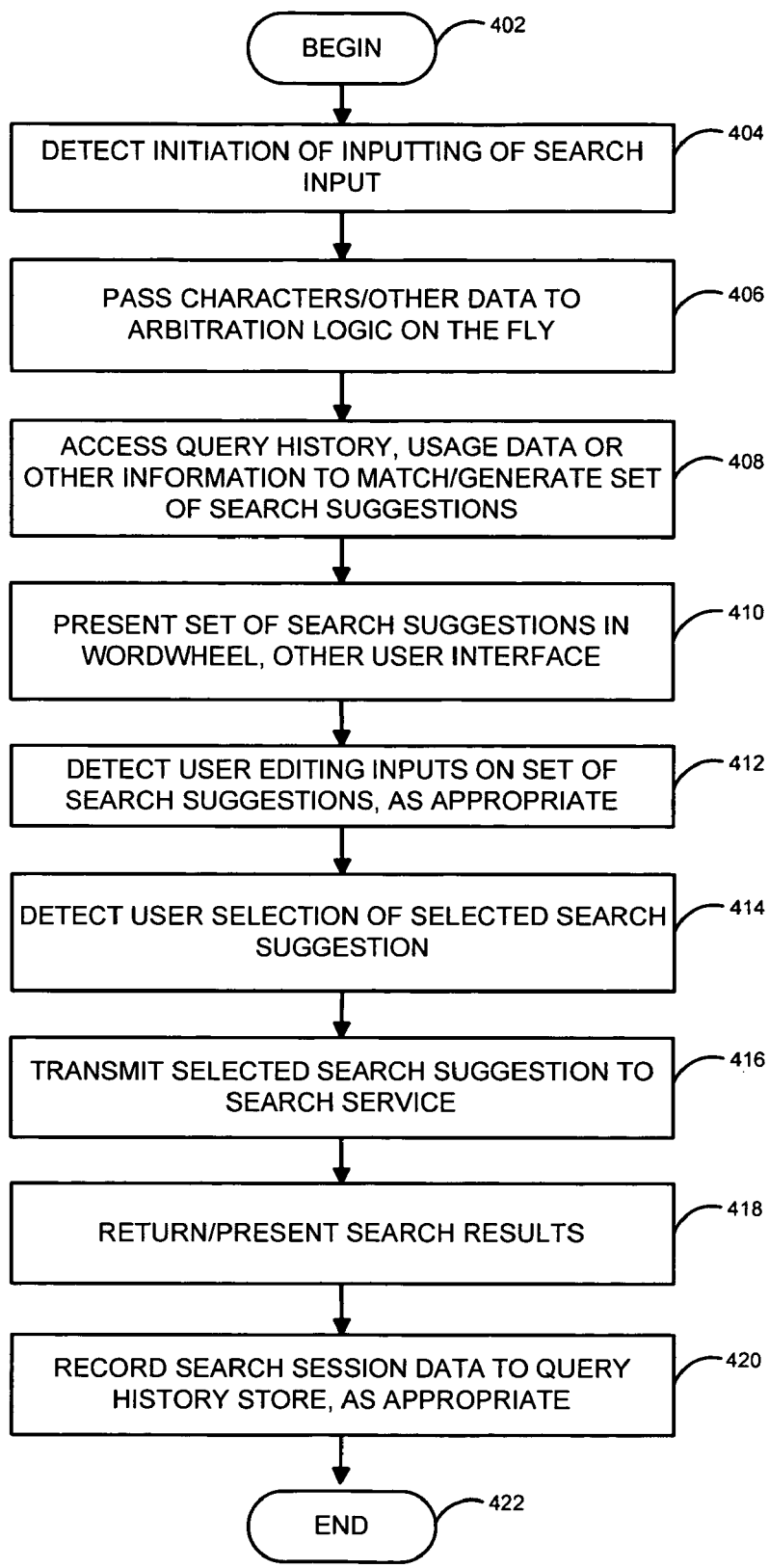
FIG. 4 illustrates a flowchart of overall inline suggested search suggestion processing, according to embodiments of the invention.

FIG. 4 illustrates overall inline suggested search term processing, according to embodiments of the invention. In step 402, processing may begin. In step 404, arbitration logic 118 may detect the initiation of the inputting of search input 108, such as by detecting keystrokes in a Web search service. In step 406, the characters or other data being inputted in the search input 108 may be passed to arbitration logic 118 on the fly, and may in embodiments be transmitted to search service 116 or other local or remote resource on a real-time or character-by-character basis as well. In step 408, query history 114, usage data 122 or other search-related information may be accessed to match or generate a set of search suggestions 110.

In step 410, the set of search suggestions 110 dynamically generated in this fashion may be presented to the user, for example via a wordwheel, drop-down or other user interface or object based on the characters or other input received in search input 108 to the current point. In step 412, user inputs reflecting the editing of the set of search suggestions 110 may be detected, for example to delete or correct an individual suggestion from the set of search suggestions 110 as those suggestions are generated and presented.

In step 414, a user selection of an individual selection in the on-the-fly set of search suggestions 110 may be detected. In step 416, the selected search suggestion from the set of search suggestions 110 may be transmitted to search service 116 or other local or remote search engine or resource. In step 418, the set of search results 112 may be returned and presented to the user, for example in a relevance-rank list or other format. In step 420, the search session data including for example any editing or selections may be stored to query history 114, as appropriate. In step 422, processing may repeat, return to a prior processing point, jump to a further processing point or end.

The foregoing description of the invention is illustrative, and modifications in configuration and implementation will occur to persons skilled in the art. For instance, while the invention has generally been described in terms of a user accessing a single search service 116, in embodiments multiple search services or engines can be accessed or used.

Similarly, while the invention has in embodiments been generally described as involving arbitration logic 118 hosted in client 102, in embodiments that control logic may be partly or wholly hosted in search service 116 or in other local or remote resources. Other hardware, software or other resources described as singular may in embodiments be distributed, and similarly in embodiments resources described as distributed may be combined. The scope of the invention is accordingly intended to be limited only by the following claims.

We claim:

1. A computer system for automatically generating a set of suggested search terms, comprising:
   a user-interface (UI) input on a lightweight communication device to receive a search input on a character-by-character basis, wherein the lightweight communication device having minimal computational resources, and wherein the minimal computation resources being configured to communicate an inputted portion of the search input on a character-by-character basis to a computing device without performing operations that generate the set of suggested search terms;
   the computing device configured to execute arbitration logic, the arbitration logic configured to communicate with the lightweight communication device and process the inputted portion of the search input upon receiving the communication of each character of the search input on the character-by-character basis from the lightweight communication device, to recursively generate a set of suggested search terms in real time coincident with user entry of each character of the search input by repeatedly accessing a query history data store, and to communicate the set of suggested search terms to the lightweight communication device coincident with the entry of each character, wherein the computing device is part of a search service having sufficient computational resources to perform the operations that generate the set of suggested search terms in real time;

the query history data store to monitor and maintain prior search inputs; and a user-interface output on the lightweight communication device for automatically presenting the set of suggested search terms, wherein presenting comprises:
   (a) rendering the set of suggested search terms via a selectable format at a UI display, wherein the set of suggested search terms is updated upon the computing device generating the set of search terms in real time coincident with the entry of each character at the UI input; and
   (b) rendering a set of selectable edit options at the UI display that, when selected, modify one or more of the rendered set of suggested search terms, wherein modifications to one or more of the rendered set of suggested search terms are automatically transmitted to the arbitration logic that incorporates those modifications in subsequent sets of suggested search terms.

2. A system according to claim 1, wherein the arbitration logic is further configured to parse the search input on a character-by-character basis.

3. A system according to claim 1, wherein the selectable format comprises a wordwheel format.

4. A system according to claim 1, wherein the set of suggested search terms are presented according to the ordering, the ordering of the set of search terms is generated by evaluating the relevance of each search term against the search input in real time.

5. A system according to claim 1, wherein the arbitration logic is further configured to access aggregate usage data to generate the set of suggested search terms.

6. A system according to claim 1, wherein, upon automatically presenting the set of suggested search terms, the arbitration logic is further configured to detect an indication of a modification to the set of suggested search terms.

7. A system according to claim 6, wherein the arbitration logic is further configured to automatically update the query history data store by incorporating the modification therein.

8. A system according to claim 1, wherein the arbitration logic is further configured to automatically update the presented set of suggested search terms in real time, incident to recognizing that the received search input is being amended.

9. A client device that performs a method for automatically generating a set of suggested search terms, the method comprising:

aggregating a user's search behavior;

establishing a user profile based upon the aggregation, wherein the user profile is automatically refined upon detecting the user's search behavior;

receiving a search input;

parsing the search input on a real time character-by-character basis incident to each keystroke during entry of the search input;

generating a set of suggested search terms by interrogating the user profile with the parsed search input;

ordering the set of suggested search terms by evaluating the relevance of each search term in the set of suggested search terms against the search input in real time;

rendering the set of suggested search terms at a UI display, wherein the set of suggested search terms is updated in real time on a character-by-character basis; and rendering a set of selectable edit options at the UI display that, when selected, modify one or more of the rendered set of suggested search terms, wherein modifications to one or more of the rendered set of suggested search terms are automatically transmitted to the user profile that incorporates those modifications in prospective sets of suggested search terms.

10. A method according to claim 9, further comprising presenting the set of suggested search terms via a selectable format.

11. A method according to claim 10, wherein the selectable format comprises at least one of a dropdown format, a wordwheel format and a popup format.

12. A method according to claim 9, wherein the set of suggested search terms are presented according to the ordering of each search term in the set of suggested search terms.

13. A method according to claim 9, wherein interrogating the user profile with the parsed search input comprises accessing query history to generate the set of suggested search terms.

14. A method according to claim 9, wherein generating further comprises:
   detecting an indication of a user modification to the set of suggested search terms upon automatically presenting the set of suggested search terms to the user; and
   automatically incorporating the modification in the prospective sets of search terms.

15. A method according to claim 9, wherein interrogating the user profile with the parsed search input comprises accessing aggregate usage data to generate the set of suggested search terms.

16. A method according to claim 9, wherein the method further comprises automatically updating the presented set of suggested search terms in real time, incident to recognizing that the received search input is being amended.

* * * * *